B. A. PLIMPTON.
STRAIN CLAMP FOR ELECTRICAL CONDUCTORS.
APPLICATION FILED OCT. 5, 1920.

1,407,477.

Patented Feb. 21, 1922.

INVENTOR.
Bentley A. Plimpton
BY Harold E. Stonebraker,
his ATTORNEY.

UNITED STATES PATENT OFFICE.

BENTLEY A. PLIMPTON, OF LIMA, NEW YORK, ASSIGNOR OF ONE-HALF TO THE PORCELAIN INSULATOR CORPORATION, OF LIMA, NEW YORK, A CORPORATION OF NEW YORK.

STRAIN CLAMP FOR ELECTRICAL CONDUCTORS.

1,407,477.  Specification of Letters Patent.  Patented Feb. 21, 1922.

Application filed October 5, 1920. Serial No. 414,879.

*To all whom it may concern:*

Be it known that I, BENTLEY A. PLIMPTON, a citizen of the United States of America, residing at Lima, in the county of Livingston and State of New York, have invented certain new and useful Improvements in Strain Clamps for Electrical Conductors, of which the following is a specification.

My invention relates to clamping devices for electric conductors, and more particularly to strain clamps, such as employed where it is necessary to make a bend or turn in a conductor.

Such clamps are applicable especially to high tension conductors, and the purpose of the invention is to provide a structure that will grip a conductor on both sides of a bend with sufficient pressure to prevent any slippage.

Another object of my improvement is to afford a device that will support a conductor and prevent it from falling, even though it is accidentally released by the clamping means.

A further purpose is to provide a practical and simple arrangement of parts, that can be manufactured at an economical figure, and which also lends itself readily to quick attachment to a conductor.

These and other improvements and advantages will be apparent from the following description, in conjunction with the accompanying drawings, the novel features being pointed out in the claims at the end of the specification.

Figure 1:
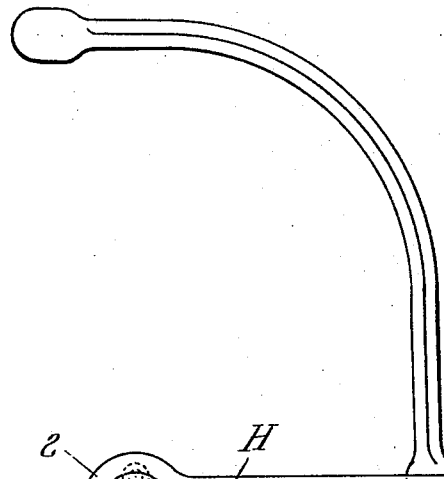
Figure 1 is a side elevation partially in section, illustrating a preferred embodiment of my improvements.
Figure 3:
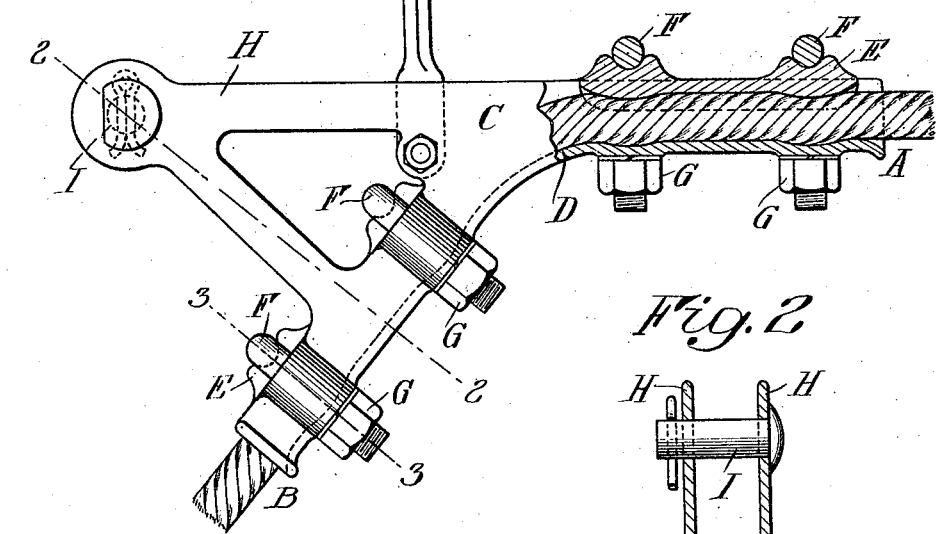
Figure 3 is a sectional view on line 3—3 of Figure 1.
Figure 3:
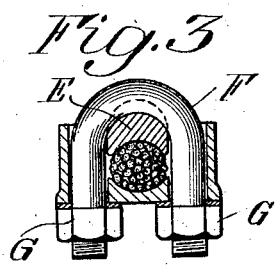
Figure 2:
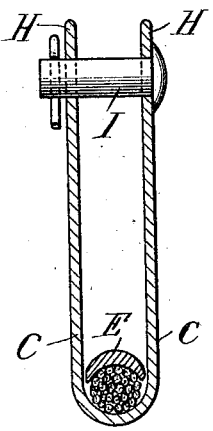
Figure 2 is a sectional view on line 2—2 of Figure 1.

As an example of a practical embodiment of the invention, I have shown a clamping member consisting of two clamping portions A and B, arranged at an angle to each other. Said clamping member is of U-shaped formation in cross section throughout both its clamping portions, and adapted to receive a conductor at its base between the opposite walls C. The clamping portions A and B are connected by a curved wall D, so that the clamping portions A and B, and curved connecting wall D afford a continuous seat for the conductor, which is clamped rigidly against the curved connecting wall in a manner that will presently appear.

In order to retain the conductor in the clamping member already described, separate clamping members are provided for engagement with the opposite side of the conductor, one cooperating with each of the aforementioned clamping portions on opposite sides of the curved wall D. Said separate clamping members are designated at E, and are each held in place by a pair of retaining devices consisting of U-bolts F, which engage recesses or grooves in the clamping members E, and then passing through openings in clamping portions A and B, are held by nuts G.

It is necessary to retain the conductor very firmly to prevent slipping, and to accomplish this, the several clamping members are provided with cooperating depressions and projections, which engage the conductor on opposite sides and are located at the point where maximum pressure is exerted. Preferably, the clamping members E have projections, and the clamping portions A and B have depressions into which the conductor is forced. These depressions and projections are arranged in alinement with the retaining bolts F, whereby the latter exert a direct and maximum pressure on the conductor in line with the projections and depressions, this serving to exert a very strong gripping action. By clamping the conductor on both sides of the curved wall D, it is drawn tightly against said curved wall which increases the binding action on the conductor.

The clamp is attached to a suitable stationary support, for which purpose, the opposite walls C are formed with extensions H having openings at their ends to receive a bolt I by which the clamping device is secured to the insulator or support. It will be seen that after the main clamping member is attached around a conductor, and the bolt I secured, the conductor is locked between the opposite walls C, and there is no possible way for it to get out of the main clamping member, even though it should get loose from the clamping members E. Thus in the event of an accidental loosening of the clamping members E, the conductor would still be retained by the main clamping member, and cannot fall to the ground. In this way, the extensions H serve as a temporary retaining means in case of accident, until the clamping members can be repaired or tightened.

The invention is not limited to the precise arrangement disclosed, but may be modified without departing from its essential features, and this application is intended to cover any changes that may come within the spirit of the improvement or the scope of the following claims.

I claim:

1. A clamping device for electric conductors comprising a clamping member of U-shaped formation in cross section adapted to receive a wire conductor between its opposite walls, and embodying two U-shaped clamping portions arranged at an angle to each other, and means cooperating with said clamping portions and acting to secure the conductor thereto.

2. A clamping device for electric conductors comprising a clamping member of U-shaped formation in cross section adapted to receive a wire conductor at its base between its opposite walls, said clamping member embodying two U-shaped clamping portions arranged at an angle to each other, and separate clamping members cooperating with each of said clamping portions.

3. A clamping device for electric conductors comprising a clamping member embodying two clamping portions arranged at an angle to each other and a curved wall connecting said clamping portions, the clamping portions and curved wall affording a continuous seat for a conductor, and separate clamping members cooperating with each of said clamping portions and acting to secure the conductor therein and against said curved connecting wall.

4. A clamping device for electric conductors comprising a clamping member of U-shaped formation in cross section and curved longitudinally, affording two clamping portions at an angle to each other, the opposite walls of the clamping member having extensions, means connecting said extensions for securing the clamping device to a support, and serving to prevent accidental removal of a conductor positioned between the walls of said clamping member, and separate clamping members cooperating with each of said clamping portions.

5. A clamping device for electric conductors comprising a clamping member of U-shaped formation in cross section and curved longitudinally to afford clamping portions at an angle to each other, extensions formed on the opposite walls of the clamping member, means connecting said extensions for securing the clamping device to a support, said connecting means also serving to prevent accidental removal of a conductor positioned between the walls of said clamping member, and separate clamping members cooperating with the angular clamping portions.

6. A clamping device for electric conductors comprising a clamping member embodying two clamping portions arranged at an angle to each other, a curved wall connecting said clamping portions, the clamping portions and curved wall affording a continuous seat for a conductor, a clamping member cooperating with each of the aforesaid clamping portions, and a pair of retaining devices cooperating between each of said clamping portions and the last mentioned clamping members, said clamping portions and clamping members having cooperating projections and depressions in alinement with the retaining devices.

7. A clamping device for electric conductors comprising a clamping member embodying two U-shaped clamping portions arranged at an angle to each other, separate clamping members cooperating with each of said clamping portions, and a pair of retaining devices cooperating between each of said clamping members and said clamping portions.

8. A clamping device for electric conductors comprising a clamping member embodying two U-shaped clamping portions arranged at an angle to each other, separate clamping members cooperating with each of said clamping portions, a pair of retaining devices cooperating between each of said clamping members and said clamping portions, the clamping members and clamping portions having cooperating projections and depressions in alinement with the retaining devices.

9. A clamping device for electric conductors comprising a clamping member of U-shaped formation in cross section and curved longitudinally, affording two U-shaped clamping portions at an angle to each other, the opposite walls of the clamping member having extensions, means connecting said extensions for securing the clamping device to a support, said connecting means also serving to prevent accidental removal of a conductor positioned between the walls of said clamping member, separate clamping members cooperating with each of said clamping portions, and a pair of retaining devices cooperating between each of said clamping members and said clamping portions, the clamping portions and clamping members having cooperating depressions and projections in alinement with the retaining devices.

10. A clamping device for electric conductors comprising a clamping member of U-shaped formation in cross section and curved longitudinally, affording two clamping portions at an angle to each other, a curved wall connecting said clamping portions, and clamping devices on opposite sides of said curved wall cooperating with said clamping portions and acting to hold a conductor tightly against said curved wall.

11. A clamping device for electric conductors comprising a clamping member of U-shaped formation in cross section and curved longitudinally, affording two clamping portions at an angle to each other, a curved wall connecting said clamping portions, clamping devices on opposite sides of said curved wall cooperating with said clamping portions and acting to hold a conductor tightly against said curved wall, and retaining devices for the clamping members, said clamping portions and clamping members having cooperating projections and depressions in alinement with the retaining devices.

12. A clamping device for electric conductors comprising a clamping member of U-shape formation in cross section adapted to receive a wire conductor at its base between its opposite walls, said clamping member embodying two U-shaped clamping portions arranged at an angle to each other, and a second clamping member cooperating with the first mentioned clamping member.

In witness whereof, I have hereunto signed my name.

BENTLEY A. PLIMPTON.